United States Patent [19]
Kejariwal et al.

[11] Patent Number: 5,343,155
[45] Date of Patent: Aug. 30, 1994

[54] FAULT DETECTION AND LOCATION SYSTEM FOR POWER TRANSMISSION AND DISTRIBUTION LINES

[75] Inventors: Murari L. Kejariwal; Baldev Thapar; Victor Gerez; Daniel March, all of Bozeman, Mont.

[73] Assignee: The Research and Development Institute, Inc. at Montana State University, Bozeman, Mont.

[21] Appl. No.: 810,410

[22] Filed: Dec. 20, 1991

[51] Int. Cl.[5] .................. G01R 31/08; H02H 3/00
[52] U.S. Cl. .................. 324/522; 324/509; 361/65
[58] Field of Search ............ 324/521, 522, 536, 509; 364/492; 361/62, 65, 81, 107

[56] References Cited

U.S. PATENT DOCUMENTS

| | | | |
|---|---|---|---|
| 2,725,526 | 11/1955 | Stringfield et al. | 314/534 |
| 2,794,071 | 5/1957 | Hughes et al. | |
| 3,176,285 | 3/1965 | Neeman | |
| 4,110,683 | 8/1978 | Cason et al. | 324/127 |
| 4,112,476 | 9/1978 | Benninger et al. | 361/42 |
| 4,295,175 | 10/1981 | Cordray | 361/69 |
| 4,321,681 | 3/1982 | Sackin et al. | 364/492 |
| 4,517,619 | 5/1985 | Uekubo | 361/64 |
| 4,620,257 | 10/1986 | Sano et al. | 361/64 |
| 4,709,339 | 11/1987 | Fernandes | 364/492 |
| 4,972,290 | 11/1990 | Sun et al. | 361/64 |
| 5,136,248 | 8/1992 | Maraio et al. | 324/536 |

FOREIGN PATENT DOCUMENTS

| | | | |
|---|---|---|---|
| 0233699 | 3/1986 | Fed. Rep. of Germany | 324/509 |
| 0243374 | 10/1986 | Japan | 324/522 |
| 0052070 | 3/1988 | Japan | 324/522 |
| 0296173 | 11/1989 | Japan | 324/522 |
| 0039669 | 2/1991 | Japan | 324/522 |
| 0711497 | 1/1980 | U.S.S.R. | 324/509 |

*Primary Examiner*—Maura K. Regan
*Attorney, Agent, or Firm*—Lowe, Price, LeBlanc & Becker

[57] ABSTRACT

A system for detecting and locating faults on a power system includes the use of fault detection and transmitting devices on each pole of the system. The fault detection apparatus includes detecting coils mounted on the static line on either side of each pole, and a third detecting coil positioned so as to detect an orthogonal magnetic flux due to a phase-to-phase fault. A microprocessor on each pole analyzes the type of fault from the output of the three coils, and transmits the identification of the pole and pertinent fault data, when appropriate, to a repeater system. Thus, fault information from an entire power system can be fed through the repeater system into a central location.

1 Claim, 5 Drawing Sheets

FAULT DETECTION AND LOCATION SYSTEM FOR POWER TRANSMISSION AND DISTRIBUTION LINES

BACKGROUND

The present invention relates generally to the detection of faults in a power system, and more particularly to providing an indication of fault location with respect to individual poles or line supports.

Temporary or permanent faults occur on a power line because of flash-over or failure of insulation. Detecting the precise location of such faults on an extended power system is problematical. While general areas under fault can be identified, the precise location of a fault often remains difficult to pinpoint, requiring substantial expenditures in time and manpower.

DISCLOSURE OF THE INVENTION

One object of the present invention is to indicate the location of a ground fault or a phase fault with respect to individual poles or line supports.

Another object of the present invention is to transmit identification data of a pole at which a fault is located to a central location.

Accordingly, the present invention includes a system for detecting and locating faults on a power transmission/distribution system having poles or line supports for the power lines and an accompanying ground line. The detection system includes sensors on the ground line of each of the poles, one sensor being arranged on each side of the pole for determining the direction of ground current in the ground line. The detection system also includes an additional sensor located at each pole or line support throughout the power transmission/distribution system to detect an orthogonal current component at each pole, indicating a phase fault. Transmission means are also located on each pole to send an identification number of the pole at which a fault is detected. This signal is received by repeater means arranged throughout the power transmission/distribution system, and sent to a central location.

BEST MODE FOR CARRYING OUT THE INVENTION

Figure 1:
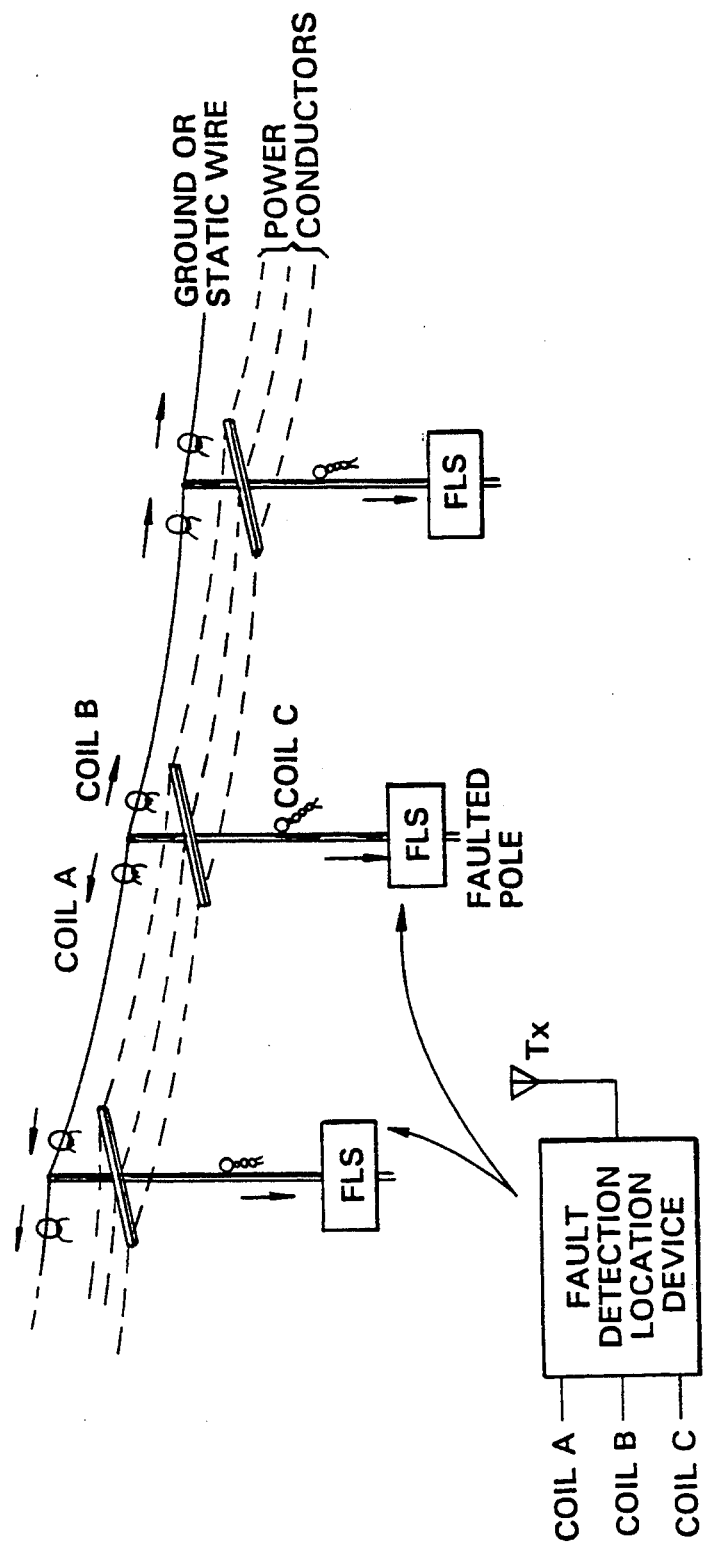
FIG. 1 is a diagram depicting the elements of the invention found at each pole.
Figure 2:
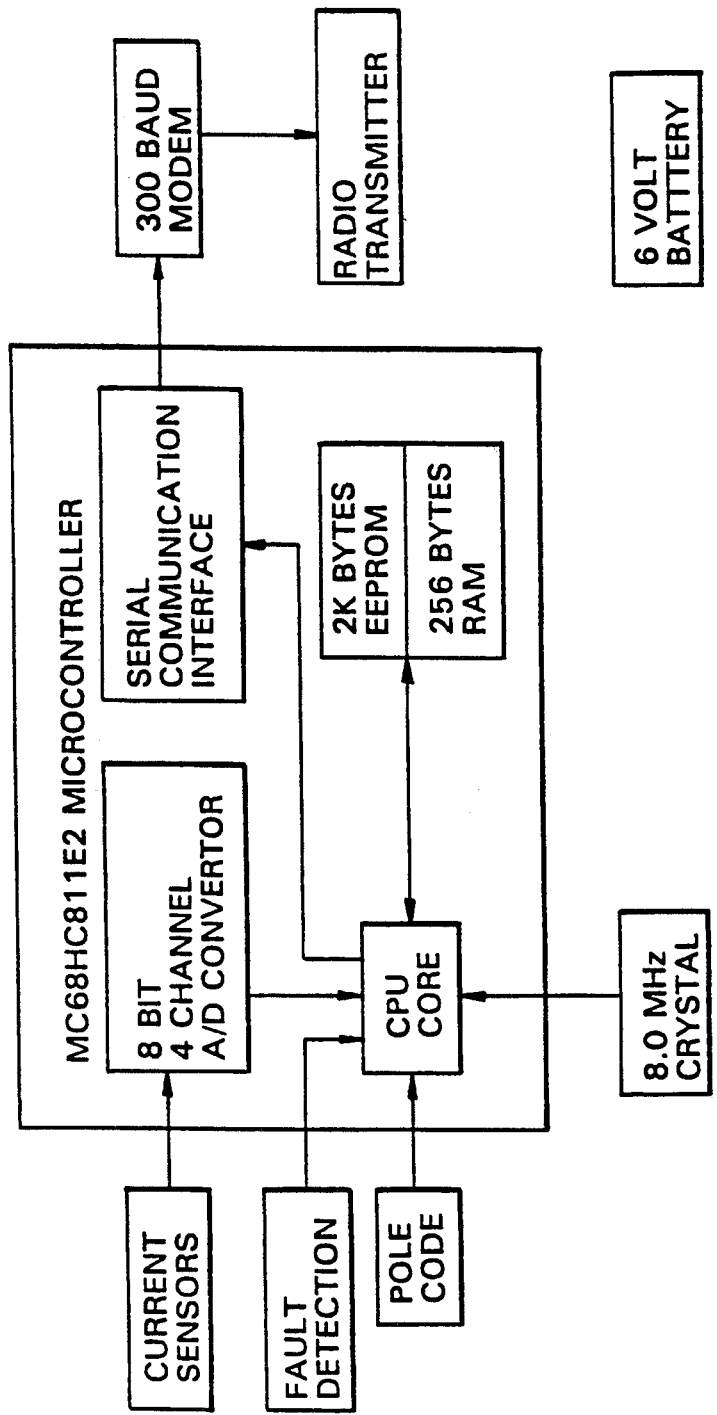
FIG. 2 is a block diagram of the fault detection and transmission circuitry located on each pole.
Figure 4:
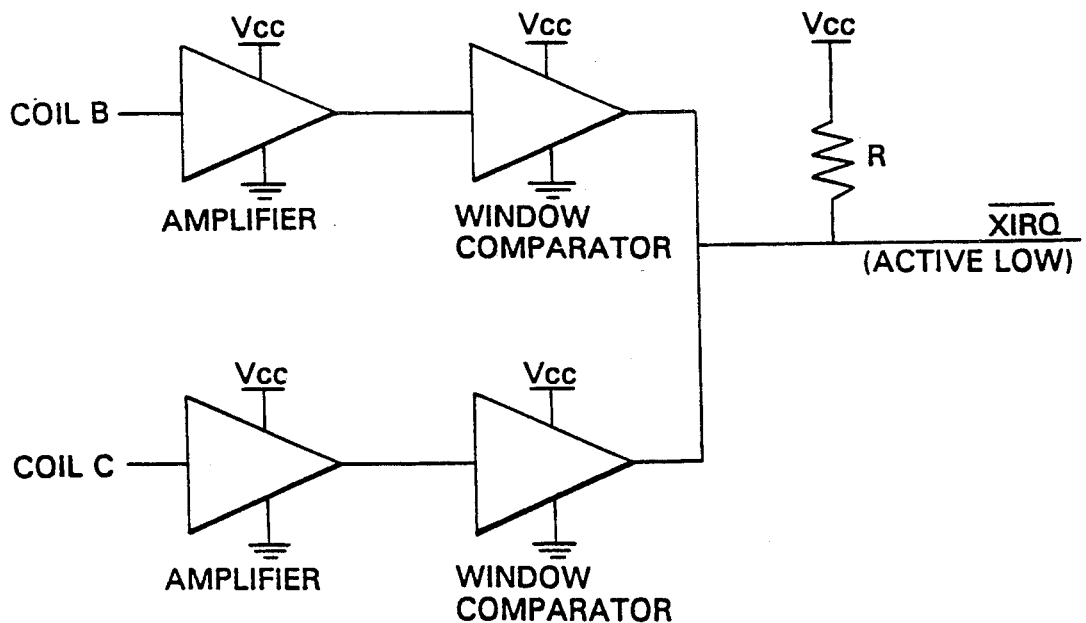
FIG. 4 is a circuit diagram of window comparators used for detecting the output of coils at each pole in the system.

As shown in FIG. 1, there are three coils used at each pole in the system. Coil A is placed on the static wire near a pole while coil B is placed on the static wire on the opposite side of the pole. Coil C is placed on the pole such that an arc due to a phase-to-phase fault induces a current in this coil. The amplified signals from the coils are input to the A/D pins on the microcontroller shown in FIG. 2. When there are no induced voltages on the coils, the output voltage of the amplifiers (not shown) is $\frac{1}{2} V_{cc}$ ($V_{cc}$ being the power supply voltage) since this is a single power supply system. The output of the amplifiers (not shown) for coils B and C are connected to window comparators depicted in FIG. 4. When there is no induced voltage on coils B or C, the output of the window comparators will be a logical high or $V_{cc}$. When the induced voltage in either coil B or C is such that the amplified signal output is either above $\frac{2}{3} V_{cc}$ or below $\frac{1}{3} V_{cc}$, the output of the comparators will be at a logical low or zero volts. This is indicative that a possible fault has occurred. The outputs of the comparators are connected to the external interrupt pin of the microcontroller depicted in FIG. 2. If the pin receives a logical low, a possible fault has occurred and an interrupt service routine software depicted in FIG. 6 will be executed.

Figure 6:
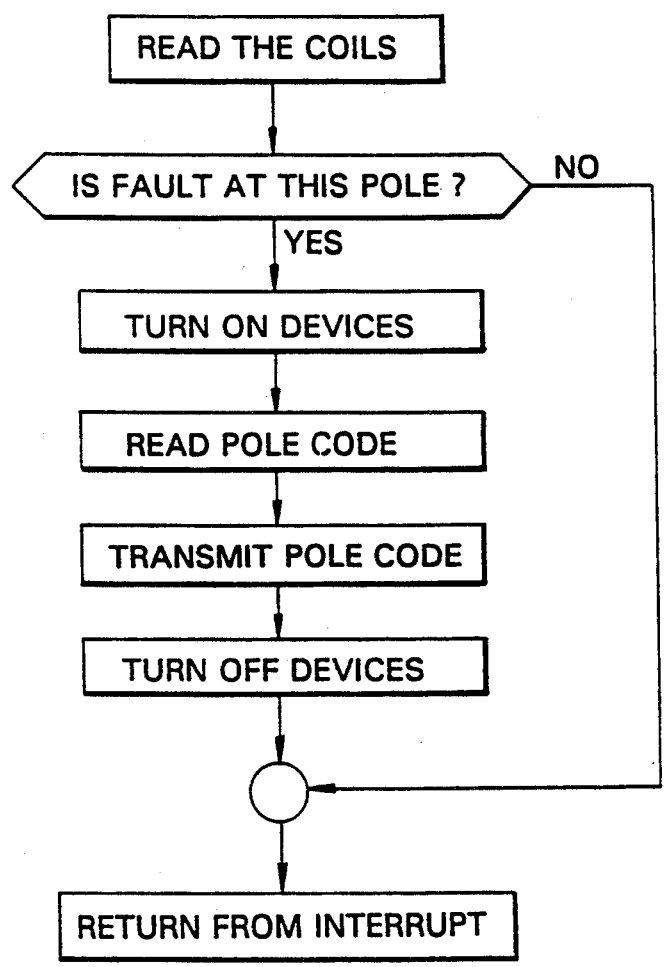
FIG. 6 is a flow chart depicting an interrupt service routine.

The interrupt service routine of FIG. 6 is run whenever the hardware detects that a fault at the corresponding pole might have occurred. The microcontroller sends the outputs of the coils through an A/D converter, determines the fault type from the digital data, and sends a fault transmission record if a fault has occurred. If a fault has not occurred, a fault transmission record is not sent.

Figure 5:
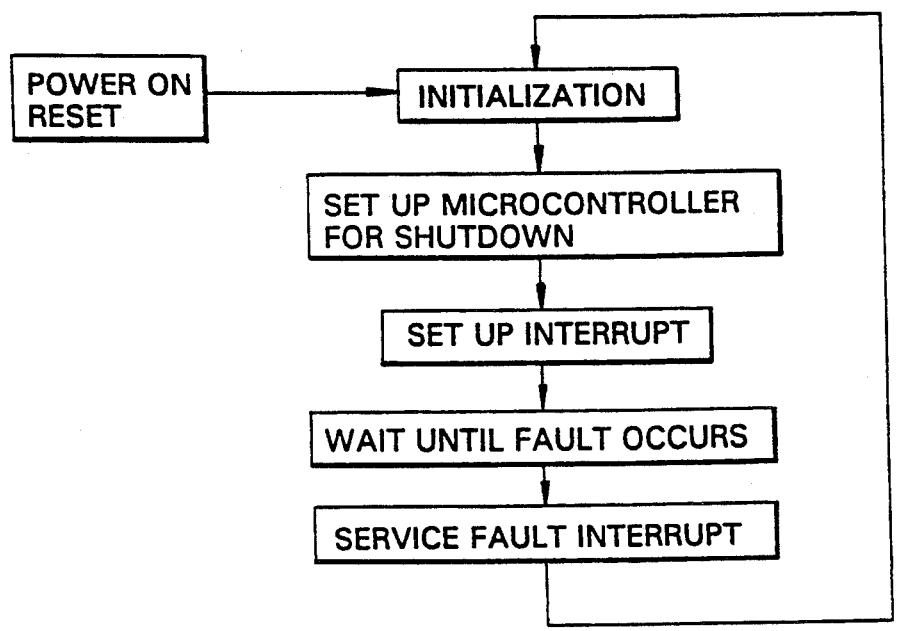
FIG. 5 is a flow chart depicting standard operating conditions.

The flow chart of FIG. 5 depicts normal operation of the system. Upon powering-up the system, the software places the microcontroller in a low power wait mode. The microcontroller waits in this low power mode until a possible fault has occurred. The microcontroller then services (executes) the interrupt service routine software depicted in FIG. 6. After servicing the interrupt routine, the microcontroller goes back to the low power mode and again awaits for a possible fault to occur.

There are three types of faults that can occur: line-to-line; line-to-ground; and, a fault at another pole. A line-to-line fault is considered to have a voltage induced in coil C due to an arc across at least two phases. There should not be any current in the static (ground) line. A line-to-ground fault can induce a voltage in coil C due to current flowing in the ground wire. The current in the static wire on the two sides of the pole should be out of phase at the pole experiencing the line to ground fault. A fault at another pole induces a voltage in coil C due to current in the ground wire. In this case, the current in the static wire on the two sides of the pole should be in phase.

Figure 3:
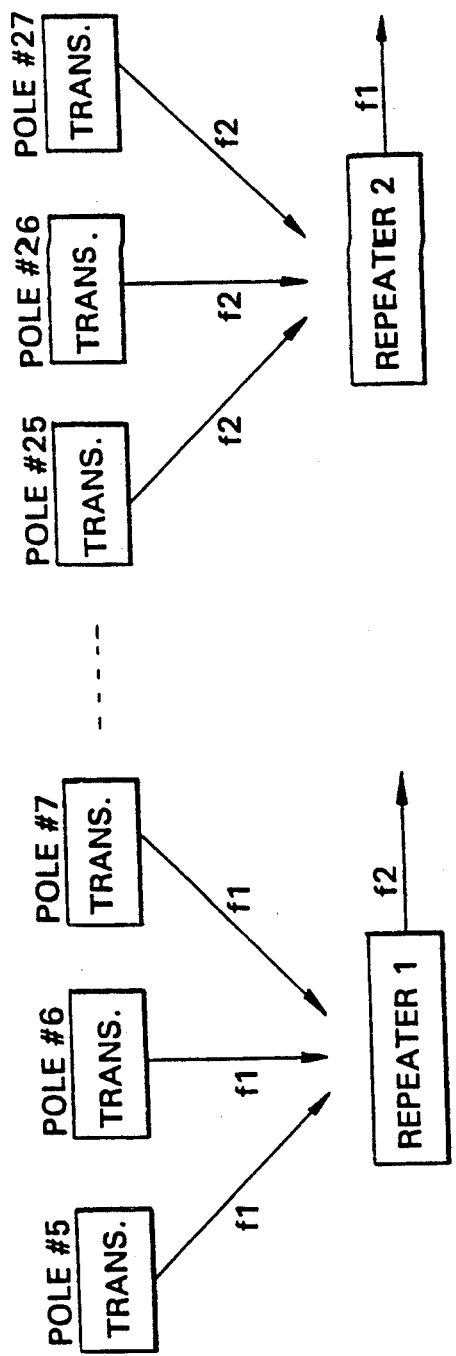
FIG. 3 is a block diagram depicting the arrangement of the fault detecting and transmission means and their associated repeaters.

The software employed determines these fault types by using two variables: valid samples and out-of-phase samples. A valid sample is defined when the digital samples of both coils A and B are outside of the region centered around a "ground" value. If there is no signal through a coil, the digital value will be in a central region and will not be considered. If the digital signals of coil A and B are on opposite sides of the central region, then the samples will be considered out-of-phase. The evaluation of the phase samples and the valid samples result in an indication of fault type which is sent from the microcontroller through a modem to a radio transmitter, and then to the repeaters shown in FIG. 3.

A pole identification code for each pole is given by the binary status of twelve switches. The switches are set to a unique pole identification code by a lineman when the unit is installed on the pole. The switches are grouped into three sets of four bits (one hex character). The encoding of the bits into the error correction code word is then a simple matter. A cyclic error correction code is used. It is a parity check code with the property that a cyclic shift of a code word results in another code word. Each set of four bits are encoded into an eight bit code word using a stored look-up table. The look-up table adds three parity bits and one extra filler bit to the four message bits resulting in an eight bit code word. The sixteen total possible combinations for the four message bits are placed into code tables using a look-up table.

The fault transmission record consists of four bytes. The first byte is the code for the type of fault that has occurred, line-to-line or line-to-ground. If the fault type is identified as being at another pole, a fault transmission record is not sent. The next three bytes are the pole identification code. All four bytes are encoded. Additionally, for testing purposes, the number of valid samples and the number of valid out-of-phase samples are also transmitted. However, these are not encoded.

The components of the fault detection and transmission sub-system depicted in FIGS. 1–4 are standard components. Consequently, the system of the present invention can be easily installed on each pole of the power transmission/distribution system, and existing repeater systems used for data transfer.

Although an embodiment of the invention has been mentioned by way of example, it is not intended that the invention be limited thereto. Accordingly, the invention should be considered to include any and all configurations, modifications, variations, combinations or equivalent arrangements falling within the scope of the following claims.

We claim:

1. A system for detecting and locating faults on a power transmission/distribution system having line supports carrying power lines and a ground line, comprising:

sensing means on said ground line at each said line support in said power transmission/distribution system arranged on each side of each said line support for determining a direction of ground current flow on said ground line;

fault detection means on each said line support in said transmission/distribution system for detecting an orthogonal current component at each respective line support due to a line to line fault;

transmission means on each said line support in said transmission/distribution system for sending an identification number of a line support at which a fault is detected; and a plurality of repeater means arranged throughout said power transmission/distribution system for receiving and sending to a central location identification numbers of the supports at which faults are detected.

* * * * *